(12) United States Patent
Tu et al.

(10) Patent No.: US 8,830,535 B2
(45) Date of Patent: Sep. 9, 2014

(54) SCANNING APPARATUS WITH CALIBRATING FUNCTION

(75) Inventors: Tung-Wen Tu, Taipei (TW); Yan-Hua Li, Taipei (TW)

(73) Assignee: Primax Electronics Ltd., Taipei (TW)

( * ) Notice: Subject to any disclaimer, the term of this patent is extended or adjusted under 35 U.S.C. 154(b) by 70 days.

(21) Appl. No.: 13/586,415

(22) Filed: Aug. 15, 2012

(65) Prior Publication Data

US 2013/0329266 A1 Dec. 12, 2013

(30) Foreign Application Priority Data

Jun. 11, 2012 (CN) .......................... 2012 1 0190700

(51) Int. Cl.
*H04N 1/04* (2006.01)

(52) U.S. Cl.
USPC ........... 358/461; 358/496; 358/498; 358/497; 358/482; 358/483

(58) Field of Classification Search
CPC ................ H04N 1/401; H04N 1/4076; H04N 2201/0424; H04N 1/193; H04N 2201/00042; H04N 1/12; H04N 1/0057; H04N 1/121; H04N 2201/00631
USPC ......... 358/461, 496, 498, 497, 474, 406, 296, 358/504, 505, 482, 483; 382/274, 312, 318, 382/319
See application file for complete search history.

(56) References Cited

U.S. PATENT DOCUMENTS

| | | | | |
|---|---|---|---|---|
| 5,396,319 | A * | 3/1995 | Tokuhashi et al. | 399/351 |
| 6,600,579 | B1 * | 7/2003 | Kumagai et al. | 358/474 |
| 7,164,507 | B2 * | 1/2007 | Beck et al. | 358/474 |
| 7,212,320 | B2 * | 5/2007 | Imoto | 358/497 |
| 7,466,457 | B2 * | 12/2008 | Chen | 358/461 |
| 7,917,060 | B2 * | 3/2011 | Miura | 399/121 |
| 8,004,726 | B2 * | 8/2011 | Misaka | 358/474 |
| 2007/0223061 | A1 * | 9/2007 | Tanaka et al. | 358/497 |
| 2007/0223062 | A1 * | 9/2007 | Tanaka et al. | 358/497 |
| 2010/0027081 | A1 * | 2/2010 | Sano et al. | 358/498 |

* cited by examiner

*Primary Examiner* — Cheukfan Lee
(74) *Attorney, Agent, or Firm* — Kirton McConkie; Evan R. Witt (57) ABSTRACT

A sheet-feeding type scanning apparatus with a calibrating function is provided. The sheet-feeding type scanning apparatus is configured for feeding a document in a first direction and scanning the document, thereby acquiring an image of the document. The sheet-feeding type scanning apparatus includes a calibration plate, a scanning module, and a transmission module. The transmission module is connected with the scanning module for moving the scanning module in a second direction perpendicular to the first direction. In such way, the scanning module is movable within the limited space of the sheet-feeding type scanning apparatus, so that the scanning module is dynamically calibrated.

16 Claims, 11 Drawing Sheets

SCANNING APPARATUS WITH CALIBRATING FUNCTION

FIELD OF THE INVENTION

The present invention relates to a scanning apparatus, and more particularly to a scanning apparatus with a calibrating function.

BACKGROUND OF THE INVENTION

Nowadays, computer systems become essential parts in our daily lives. With rapid development of the computer systems, the computer peripheral devices which are closely related to the computer systems are gradually developed. For example, a scanning apparatus is one of the widely-used computer peripheral devices. Generally, the scanning apparatus is used for scanning images of paper documents. Consequently, the contents of the paper documents can be converted into electronic files. The electronic files may be further spread, managed or stored by the user. With the maturity of scanning technologies, the scanning apparatuses have experienced great growth and are now rapidly gaining in popularity.

In the early stage, the scanning apparatus can only scan the image of a single document. For scanning a stack of documents, after the image of the document is scanned, the document is removed and then a next document is placed on the scanning apparatus in order to scan the image of the next document. Since the process of manually replacing the documents is very troublesome, the conventional scanning apparatus is not feasible to scan a stack of documents. For solving these drawbacks, an automatic document feeder is introduced into the market. The automatic document feeder and the scanning apparatus are collaboratively defined as a sheet-feeding type scanning apparatus. By the sheet-feeding type scanning apparatus, it is not necessary to manually replace the documents while the scanning operations are performed. In other words, by the sheet-feeding type scanning apparatus, the stack of documents can be effectively scanned or even the duplex scanning operations on the documents may be performed.

Generally, a calibration plate is included in a flatbed scanning portion of the scanning apparatus. Before a scanning operation is performed, a calibrating operation may be performed by scanning the calibration plate in order to correct the errors from the optical and electronic system of the scanning apparatus. The optical and electronic system includes for example a light source, a lens and an optical sensing element. Generally, the calibrating operation includes for example a color calibrating operation, a brightness calibrating operation or a contrast calibrating operation.

Figure 1:
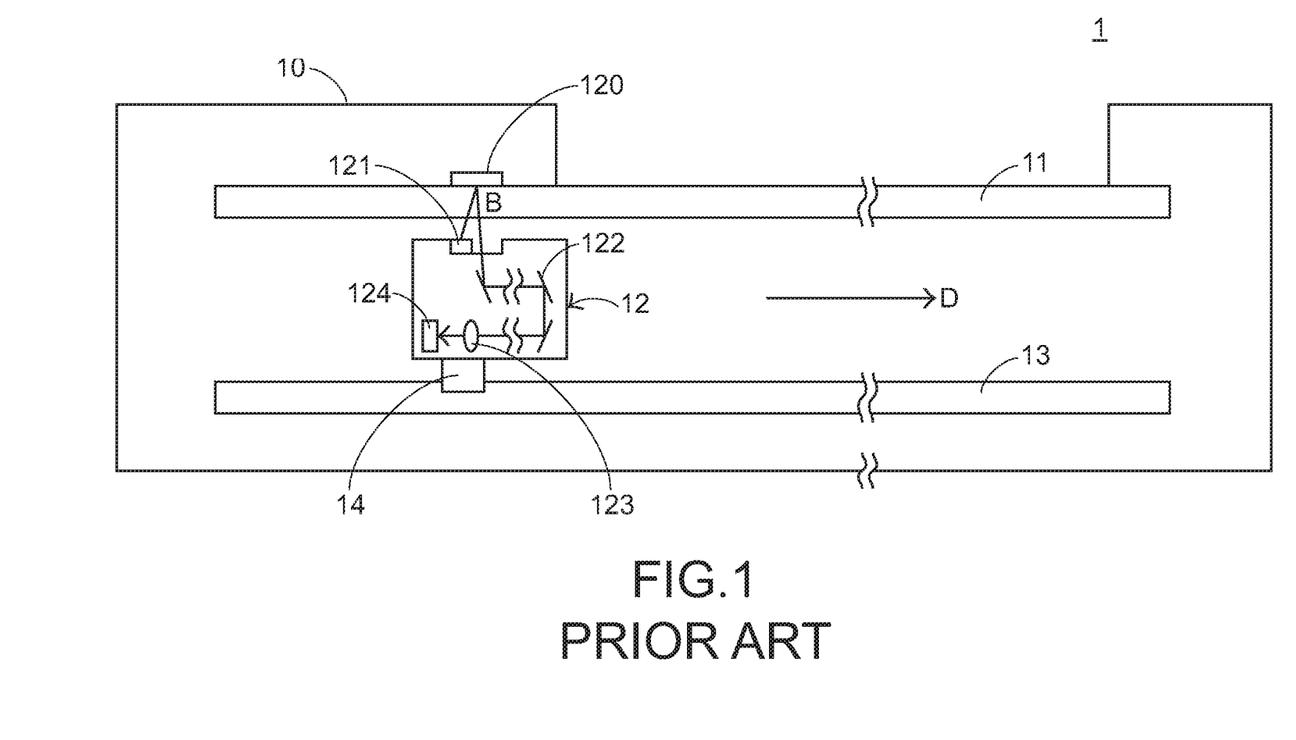
FIG. 1 schematically illustrates the structure of a flatbed scanning portion of a conventional apparatus.

Hereinafter, a process of calibrating the flatbed scanning portion of a conventional apparatus will be illustrated with reference to FIG. 1. FIG. 1 schematically illustrates the structure of a flatbed scanning portion of a conventional apparatus. As shown in FIG. 1, the conventional flatbed scanning portion 1 comprises a casing 10, a glass platform 11, a scanning module 12, a transmission mechanism 13, and a connecting element 14. Moreover, the scanning module 12 comprises a calibration plate 120, a light source 121, a reflective mirror 122, a lens 123, and an optical sensing element 124. Take the color calibrating operation for example. The calibration plate 120 may have a white color or a black color. That is, the calibration plate 120 may be used as a standard white reference plate or a standard black reference plate. As shown in FIG. 1, the calibration plate 120 has a white color and is served as a standard white reference plate.

Before a document (not shown) is scanned by the flatbed scanning portion 1 of the conventional scanning apparatus, the document is placed on the glass platform 11. The scanning module 12 is connected with the transmission mechanism 13 through the connecting element 14. The transmission mechanism 13 is driven to move the scanning module 12 along the glass platform 11. That is, the scanning module 12 is moved in a moving direction D to the location under the calibration plate 120. Meanwhile, a light beam B emitted from the light source 121 is projected on the calibration plate 120. The light beam B is reflected by the calibration plate 120, and subsequently reflected by the reflective mirror 122. The light beam B is then transmitted through and focused by the lens 123. The focused light beam B is received by the optical sensing element 124, and then the optical signal is converted into an electronic signal by the optical sensing element 124. Moreover, in the conventional flatbed scanning portion 1 of FIG. 1, the light source 121 is a light emitting diode (LED), and the optical sensing element 124 is a charge coupled device (CCD) or a contact image sensor (CIS).

In such way, a standard white value corresponding to the calibration plate 120 is acquired by the flatbed scanning portion 1. The standard white value is used as a white color basis. After the color calibrating operation is completed, the document (not shown) placed on the glass platform 11 is scanned by the flatbed scanning portion 1. Since the standard white value provided by the calibration plate 120 is severed as a basis of scanning the white region, the scanned image may be subject to calibrating compensation.

The process of calibrating the conventional flatbed scanning portion has been mentioned above. The process of calibrating the sheet-feeding type scanning apparatus, which is a combination of the conventional flatbed scanning portion and an automatic document feeder, is similar to the process of calibrating the conventional flatbed scanning portion. Generally, most of the current sheet-feeding type scanning apparatuses have a duplex scanning function. The sheet-feeding type scanning apparatuses with the duplex scanning function are also referred as duplex scanning apparatuses. Moreover, the duplex scanning apparatuses may be classified into two types. The first type duplex scanning apparatus is a duplex scanning apparatus with a single scanning module. The second type duplex scanning apparatus is a duplex scanning apparatus with two scanning modules.

Figure 2:
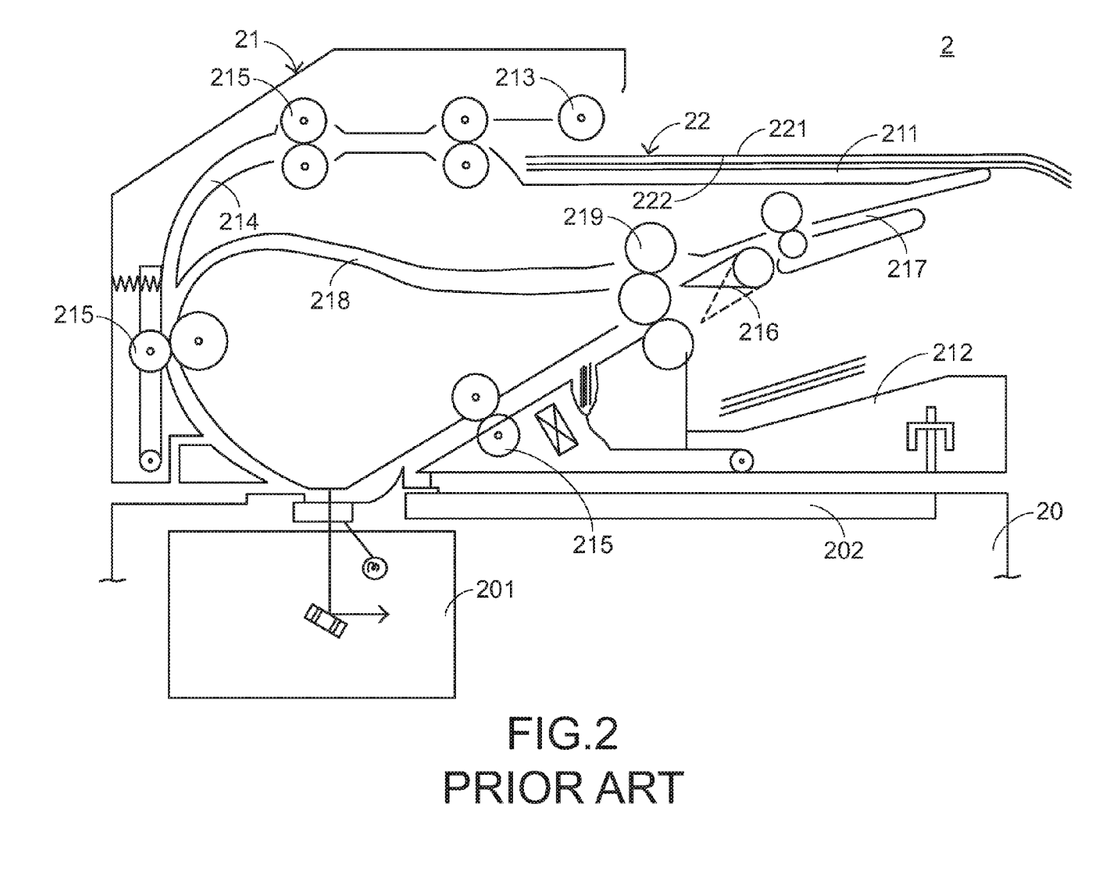
FIG. 2 is a schematic side view illustrating the structure of a conventional first type duplex scanning apparatus.

FIG. 2 is a schematic side view illustrating the structure of a conventional first type duplex scanning apparatus. As shown in FIG. 2 the conventional first type duplex scanning apparatus 2 comprises a flatbed scanning portion 20 and an automatic document feeder 21. The flatbed scanning portion 20 comprises a scanning module 201 and a glass platform 202. The structure of the flatbed scanning portion 20 is similar to that of the conventional flatbed scanning portion 1 of FIG. 1, and is not redundantly described herein. Moreover, the automatic document feeder 21 comprises a sheet input tray 211, a sheet output tray 212, a sheet pick-up module 213, a sheet transfer channel 214, plural transfer rollers 215, a switching element 216, an inverting region 217, an inverting channel 218, and a sheet ejecting roller assembly 219.

The process of performing a duplex scanning operation by the conventional first type duplex scanning apparatus 2 will be illustrated as follows. Firstly, plural documents 22 to be scanned are placed on the sheet input tray 211, wherein the first sides 221 of the documents 22 face upwardly. Then, the uppermost document 22 is fed into the sheet transfer channel 214 by the sheet pick-up module 213 of the automatic document feeder 21. Then, the document 22 is transferred through the scanning module 201 by the plural transfer rollers 215, wherein the first side 221 of the document 22 faces the scanning module 201. The image of the first side 221 of the document 22 is read by the scanning module 201, so that a first side image is acquired. By the way, while the duplex scanning operation is performed by the conventional first type duplex scanning apparatus 2, the scanning module 201 is not movable along the glass platform 202.

After the first side 221 of the document 22 has been scanned, the document 22 is transported into the inverting region 217 by the plural transfer rollers 215 and the sheet ejecting roller assembly 219. By swinging the switching element 216 to open the channel, the document 22 is introduced into the inverting region 217 or ejected to the sheet output tray 212. In a case that the document 22 is introduced into the inverting region 217, the switching element 216 is swung and the document 22 is transported into the inverting channel 218 by the sheet ejecting roller assembly 219. After the document 22 is transferred through the inverting channel 218, the document 22 is transferred through the scanning module 201, wherein a second side 222 of the document 22 faces the scanning module 201. When the document 22 is transferred through the scanning module 201, the image of the second side 222 of the document 22 is read by the scanning module 201, so that a second side image is acquired.

After the second side 222 of the document 22 has been scanned, the document 22 is transported into the inverting region 217 again and then transported into the inverting channel 218 again. Consequently, the document 22 is transferred through the scanning module 201 again, wherein the first side 221 of the document 22 faces the scanning module 201. Under this circumstance, the image of the first side 221 of the document 22 is not scanned by the scanning module 201. Then, the document 22 is ejected to the sheet output tray 212 through the switching element 216. Meanwhile, the duplex scanning operation on the document 22 is completed.

Since the first type duplex scanning apparatus contains a single scanning module, the document should be transferred through the scanning module for three times while one duplex scanning operation is performed by this duplex scanning apparatus. Therefore, the first type duplex scanning apparatus is referred as a three-pass duplex scanning apparatus.

Figure 3:
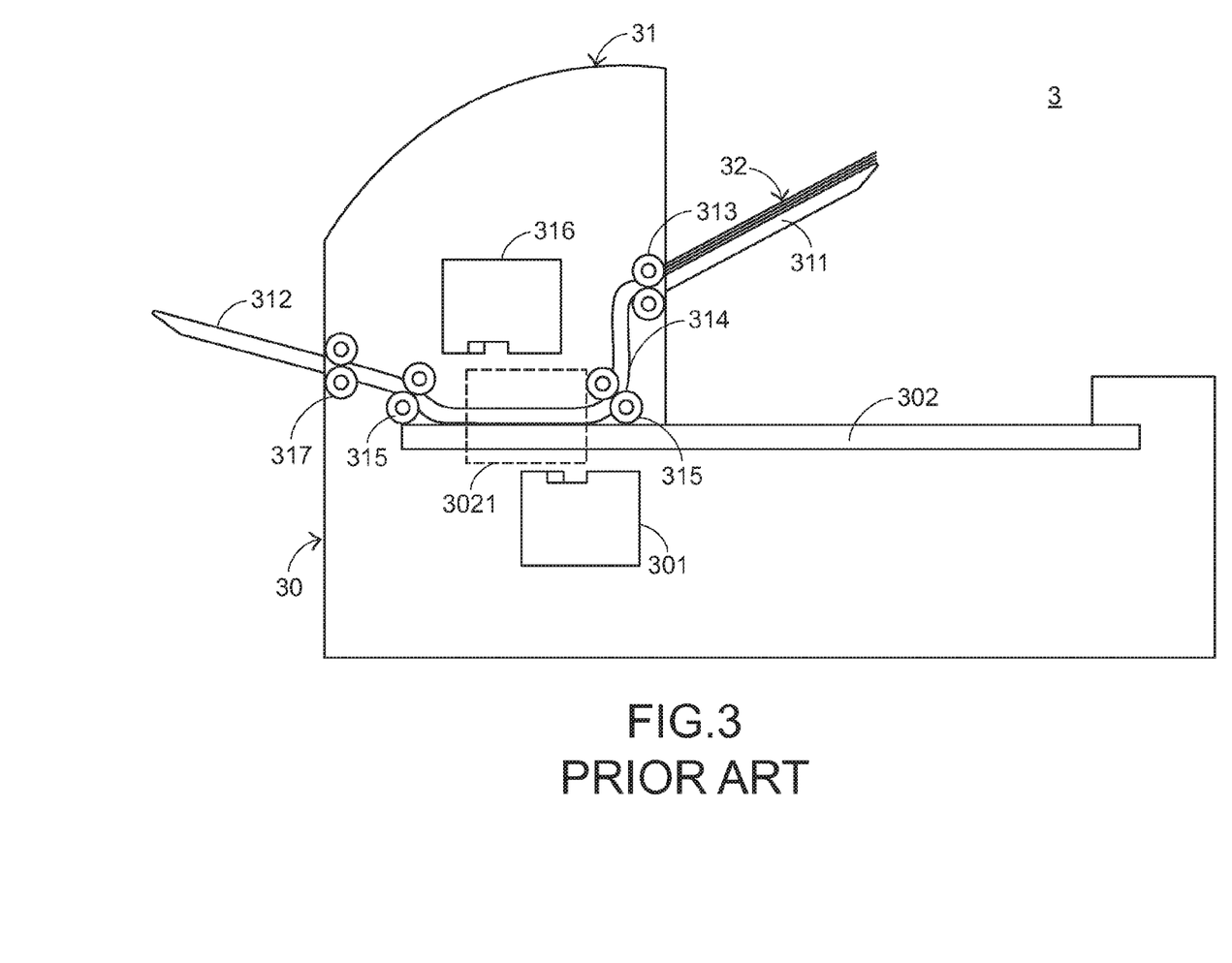
FIG. 3 is a schematic side view illustrating the structure of a conventional second type duplex scanning apparatus.

Hereinafter, the structure of a conventional second type duplex scanning apparatus will be illustrated with reference to FIG. 3. FIG. 3 is a schematic side view illustrating the structure of a conventional second type duplex scanning apparatus. As shown in FIG. 3, the conventional second type duplex scanning apparatus 3 comprises a flatbed scanning portion 30 and an automatic document feeder 31. The automatic document feeder 31 comprises a sheet input tray 311, a sheet output tray 312, a sheet pick-up module 313, a sheet transfer channel 314, plural transfer rollers 315, a first scanning module 316, and a sheet ejecting roller assembly 317. The flatbed scanning portion 30 comprises a second scanning module 301 and a glass platform 302.

The process of performing a duplex scanning operation by the conventional second type duplex scanning apparatus 3 will be illustrated as follows. Firstly, plural documents 32 to be scanned are placed on the sheet input tray 311, wherein the first sides 321 of the documents 32 face upwardly. Then, the uppermost document 32 is fed into the sheet transfer channel 314 by the sheet pick-up module 313. Then, the document 32 is transferred through a scanning window 3021 of the glass platform 302 by the plural transfer rollers 315. Consequently, the images of the document 32 are scanned by the first scanning module 316 and the second scanning module 301 through the scanning window 3021. That is, the image of the first side 321 of the document 32 is scanned by the first scanning module 316, and the image of a second side 322 of the document 32 is scanned by the second scanning module 301. After the document 32 is completely transferred through the scanning window 3021, it means that the images of both sides of the documents have been scanned. Then, the document 32 is transported to the sheet output tray 312 by the plural transfer rollers 315 and the sheet ejecting roller assembly 317. Meanwhile, the duplex scanning operation on the document 32 is completed.

Since the document is only transferred through the scanning modules once while one duplex scanning operation is performed by the second type duplex scanning apparatus, the second type duplex scanning apparatus is referred as a one-pass duplex scanning apparatus.

Moreover, the three-pass duplex scanning apparatus may be calibrated by the similar process of calibrating the above conventional flatbed scanning portion. Although the second scanning module within the flatbed scanning portion of the one-pass duplex scanning apparatus can be calibrated by the similar process of calibrating the above conventional flatbed scanning portion, the first scanning module within the automatic document feeder of the one-pass duplex scanning apparatus fails to effectively calibrated because the space within the automatic document feeder is limited. Especially, since the trends in designing the duplex scanning apparatus are toward small size and small volume, the transmission mechanism for moving the first scanning module fails to be installed within the automatic document feeder. That is, since the first scanning module fails to be moved, the calibrating operation cannot be effectively done. Under this circumstance, the scanning quality is unstable and even the scanning quality is deteriorated.

Therefore, there is a need of providing a sheet-feeding type scanning apparatus with a calibrating function and providing a duplex scanning apparatus with two scanning modules which have the calibrating functions.

SUMMARY OF THE INVENTION

The present invention provides a sheet-feeding type scanning apparatus with a calibrating function.

The present invention also provides a duplex scanning apparatus with two scanning modules, in which both of the two scanning modules have the calibrating functions.

In accordance with an aspect of the present invention, there is provided a sheet-feeding type scanning apparatus with a calibrating function. The sheet-feeding type scanning apparatus is configured for feeding a document, moving the document in a first direction and reading an image of the document. The sheet-feeding type scanning apparatus includes a sheet transfer channel, a scanning module, a calibration plate, and a transmission module. The sheet transfer channel may allow the document to go through. The scanning module is disposed in the sheet transfer channel for scanning a first side of the document, thereby acquiring a first side image of the document. The calibration plate is disposed over the scanning module, wherein the scanning module is calibrated according to the calibration plate. The transmission module is connected with the scanning module for moving the scanning module in a second direction perpendicular to the first direction, so that the scanning module is calibrated while the scanning module is moved. The transmission module includes a push gear and an elastic element. The push gear is located at a first side of the scanning module. Upon rotation of the push gear, the scanning module is moved in the second direction. The elastic element is located at a second side of the scanning module for providing an elastic force to the scanning module. In response to the elastic force, the scanning module is moved in a third direction opposite to the second direction and returned to an original position.

In an embodiment, the transmission module further includes a contact lever. The contact lever is contacted with the push gear and arranged between the scanning module and the push gear. When the contact lever is pushed by the push gear, the scanning module is pushed by the contact lever, so that the scanning module is moved in the second direction.

In an embodiment, the transmission module further includes an additional elastic element, which is sheathed around the contact lever and contacted with the scanning module. By the additional elastic element, the contact lever is fixed between the scanning module and the push gear.

In an embodiment, the scanning module further includes a contact lever. The contact lever is located at the first side of the scanning module and contacted with the push gear. When the contact lever is pushed by the push gear, the scanning module is correspondingly moved, so that the scanning module is moved in the second direction.

In an embodiment, the push gear has a convex structure. Upon rotation of the push gear, the convex structure is contacted with the contact lever to push the contact lever. Moreover, the convex structure is integrally formed with the push gear.

In an embodiment, the sheet-feeding type scanning apparatus further includes a driving device and a transmission gear set. The driving device is used for providing a motive force. The transmission gear set is connected with the driving device and the push gear. By the transmission gear set, the motive force is transmitted to the push gear to result in rotation of the push gear.

In an embodiment, the sheet-feeding type scanning apparatus further includes an additional scanning module and an additional calibration plate. The additional scanning module is disposed under the sheet transfer channel for scanning a second side of the document, thereby acquiring a second side image of the document. The additional calibration plate is disposed above the additional scanning module. The additional scanning module is calibrated according to the additional calibration plate. Moreover, the additional scanning module is moved in the first direction to be calibrated.

In an embodiment, the sheet-feeding type scanning apparatus further includes a flatbed scanning portion. The flatbed scanning portion is disposed under the sheet transfer channel. The flatbed scanning portion and the sheet-feeding type scanning apparatus are collaboratively defined as a duplex scanning apparatus. The flatbed scanning portion includes a glass platform, an additional scanning module, and an additional calibration plate. The glass platform is located at a top surface of the flatbed scanning portion. The additional scanning module is disposed within the flatbed scanning portion for scanning a second side of the document, thereby acquiring a second side image of the document. The additional calibration plate is disposed above the additional scanning module. The additional scanning module is calibrated according to the additional calibration plate. Moreover, the additional scanning module is moved in the first direction to be calibrated.

In accordance with another aspect of the present invention, there is provided a sheet-feeding type scanning apparatus with a calibrating function. The sheet-feeding type scanning apparatus is configured for feeding a document, moving the document in a first direction and reading an image of the document. The sheet-feeding type scanning apparatus includes a sheet transfer channel, a scanning module, a calibration plate, and a transmission module. The sheet transfer channel may allow the document to go through. The scanning module is disposed in the sheet transfer channel for scanning a first side of the document, thereby acquiring a first side image of the document. The calibration plate is disposed over the scanning module, wherein the scanning module is calibrated according to the calibration plate. The transmission module is connected with the calibration plate for moving the calibration plate in a second direction perpendicular to the first direction, so that the scanning module is calibrated while the calibration plate is moved. The transmission module includes a push gear and an elastic element. The push gear is located at a first side of the calibration plate. Upon rotation of the push gear, the calibration plate is moved in the second direction. The elastic element is located at a second side of the calibration plate for providing an elastic force to the calibration plate. In response to the elastic force, the calibration plate is moved in a third direction opposite to the second direction and returned to an original position.

In an embodiment, the transmission module further includes a contact lever. The contact lever is contacted with the push gear and arranged between the calibration plate and the push gear. When the contact lever is pushed by the push gear, the calibration plate is pushed by the contact lever, so that the calibration plate is moved in the second direction.

In an embodiment, the transmission module further includes an additional elastic element, which is sheathed around the contact lever and contacted with the calibration plate. By the additional elastic element, the contact lever is fixed between the calibration plate and the push gear.

In an embodiment, the calibration plate further includes a contact lever. The contact lever is located at the first side of the calibration plate and contacted with the push gear. When the contact lever is pushed by the push gear, the calibration plate is correspondingly moved, so that the calibration plate is moved in the second direction.

In an embodiment, the push gear has a convex structure. Upon rotation of the push gear, the convex structure is contacted with the contact lever to push the contact lever. Moreover, the convex structure is integrally formed with the push gear.

In an embodiment, the sheet-feeding type scanning apparatus further includes a driving device and a transmission gear set. The driving device is used for providing a motive force. The transmission gear set is connected with the driving device and the push gear. By the transmission gear set, the motive force is transmitted to the push gear to result in rotation of the push gear.

In an embodiment, the sheet-feeding type scanning apparatus further includes an additional scanning module and an additional calibration plate. The additional scanning module is disposed under the sheet transfer channel for scanning a second side of the document, thereby acquiring a second side image of the document. The additional calibration plate is disposed above the additional scanning module. The additional scanning module is calibrated according to the additional calibration plate. Moreover, the additional scanning module is moved in the first direction to be calibrated.

In an embodiment, the sheet-feeding type scanning apparatus further includes a flatbed scanning portion. The flatbed scanning portion is disposed under the sheet transfer channel. The flatbed scanning portion and the sheet-feeding type scanning apparatus are collaboratively defined as a duplex scanning apparatus. The flatbed scanning portion includes a glass platform, an additional scanning module, and an additional calibration plate. The glass platform is located at a top surface of the flatbed scanning portion. The additional scanning module is disposed within the flatbed scanning portion for scanning a second side of the document, thereby acquiring a second side image of the document. The additional calibration plate is disposed above the additional scanning module. The additional scanning module is calibrated according to the additional calibration plate. Moreover, the additional scanning module is moved in the first direction to be calibrated.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a sheet-feeding type scanning apparatus with a calibrating function.

Figure 4:
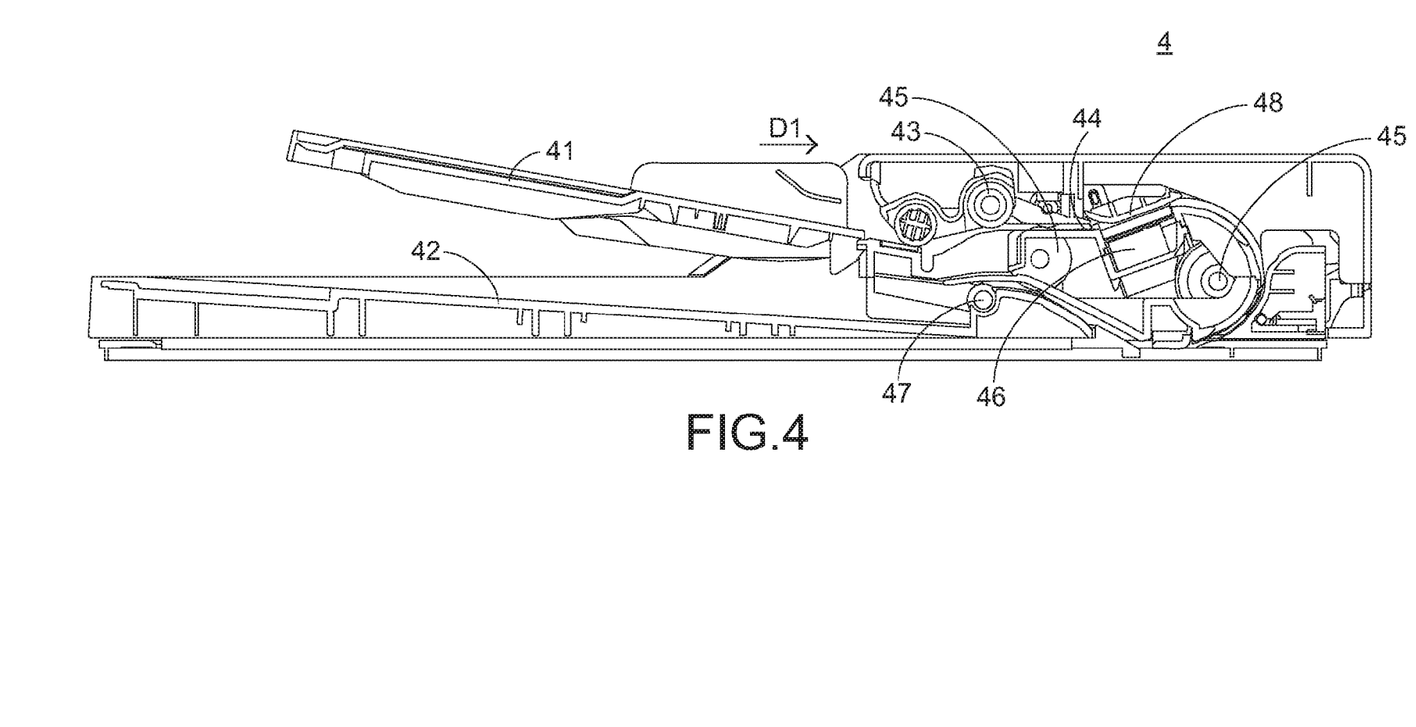
FIG. 4 is a schematic cross-sectional side view illustrating the structure of a sheet-feeding type scanning apparatus with a calibrating function according to a first embodiment of the present invention.
Figure 5:
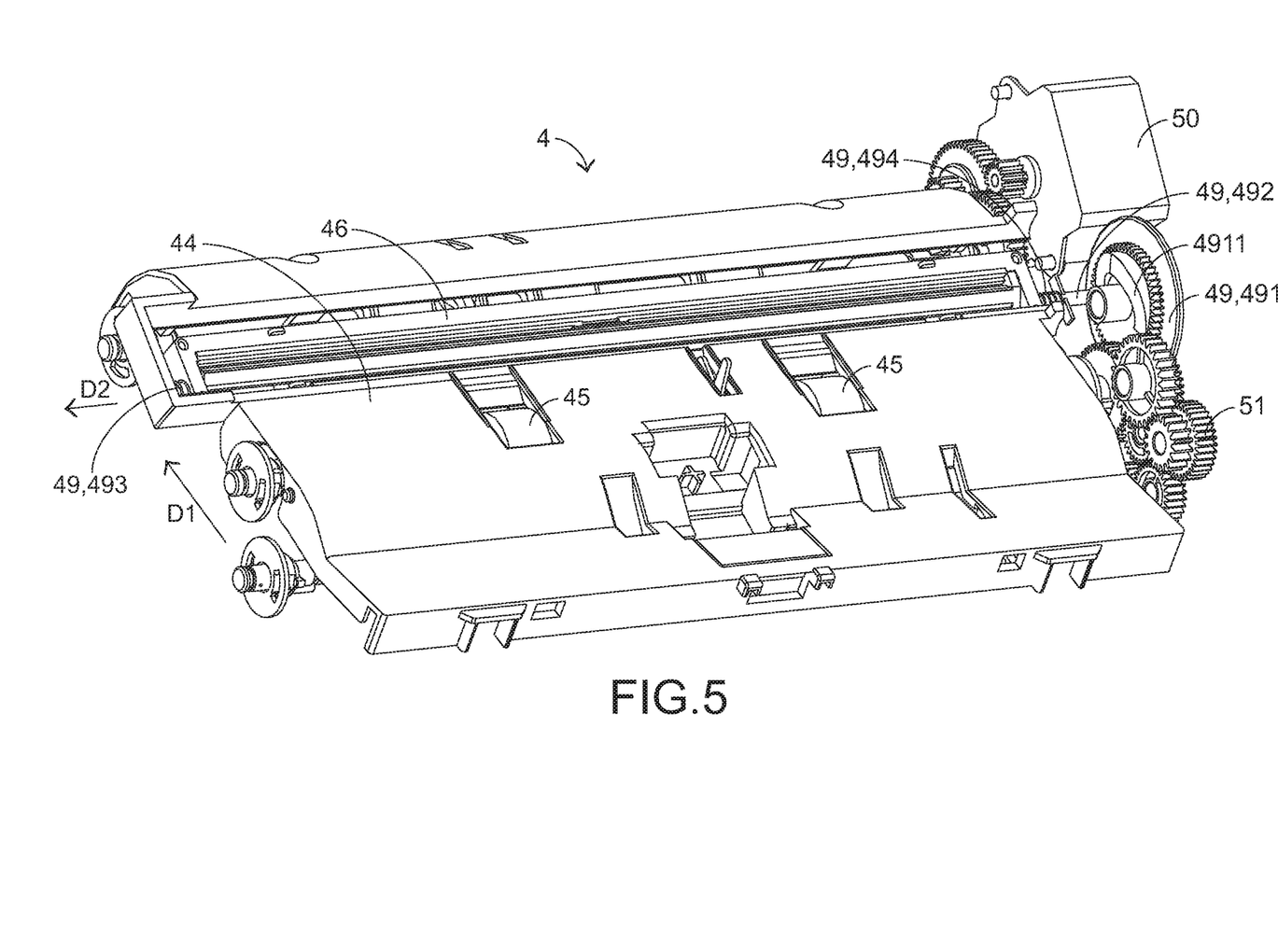
FIG. 5 is a schematic perspective view illustrating the scanning module and the transmission module of the sheet-feeding type scanning apparatus according to the first embodiment of the present invention.

FIG. 4 is a schematic cross-sectional side view illustrating the structure of a sheet-feeding type scanning apparatus with a calibrating function according to a first embodiment of the present invention. FIG. 5 is a schematic perspective view illustrating the scanning module and the transmission module of the sheet-feeding type scanning apparatus according to the first embodiment of the present invention. Please refer to FIGS. 4 and 5. The sheet-feeding type scanning apparatus 4 is used for feeding a document (not shown), moving the document in a first direction D1, and reading the image of the document. The sheet-feeding type scanning apparatus 4 comprises a sheet input tray 41, a sheet output tray 42, a sheet pick-up module 43, a sheet transfer channel 44, plural transfer rollers 45, a scanning module 46, a sheet ejecting roller assembly 47, a calibration plate 48, a transmission module 49, a driving device 50, and a transmission gear set 51.

As shown in FIG. 4, the documents to be scanned are placed on the sheet input tray 41. The sheet output tray 42 is disposed under the sheet input tray 41. After the documents are scanned, the scanned documents are placed on the sheet output tray 42. The sheet transfer channel 44 is disposed within the sheet-feeding type scanning apparatus 4. In addition, the sheet transfer channel 44 is arranged between the sheet input tray 41 and the sheet output tray 42 for allowing the documents to go through. The sheet pick-up module 43 is arranged between the sheet input tray 41 and the sheet transfer channel 44. By the sheet pick-up module 43, the uppermost document on the sheet input tray 41 is fed into the sheet transfer channel 44. The plural transfer rollers 45 are used for transferring the document through the sheet transfer channel 44. The scanning module 46 is disposed in the sheet transfer channel 44. The scanning module 46 is used for scanning a first side of the document, thereby acquiring a first side image of the document. The sheet ejecting roller assembly 47 is arranged between the sheet transfer channel 44 and the sheet output tray 42. After the document has been scanned, the scanned document is ejected to the sheet output tray 42 by the sheet ejecting roller assembly 47. The calibration plate 48 is disposed over the sheet transfer channel 44 and the scanning module 46 for calibrating the scanning module 46. The process of scanning the document is similar to the conventional scanning process, and is not redundantly described herein.

As shown in FIG. 5, the transmission module 49 is connected with the scanning module 46. The transmission module 49 is used for moving the scanning module 46 in a second direction D2 in order to perform a calibrating operation, wherein the second direction D2 is perpendicular to the first direction D1. The transmission module 49 comprises a push gear 491, a contact lever 492, a first elastic element 493, and a second elastic element 494. The push gear 491 is located at a first side of the scanning module 46. As the push gear 491 is rotated, the scanning module 46 is moved in the second direction D2. The contact lever 492 is contacted with the push gear 491, and arranged between the scanning module 46 and the push gear 491. Upon rotation of the push gear 491, the contact lever 492 is pushed by the push gear 491, and thus the scanning module 46 is pushed by the contact lever 492. Consequently, the scanning module 46 is moved in the second direction D2. The first elastic element 493 is located at a second side of the scanning module 46 and contacted with the scanning module 46. The first elastic element 493 is used for providing a first elastic force to the scanning module 46. In response to the first elastic force, the scanning module 46 is moved in a third direction D3 (see FIG. 7) and returned to the original position, wherein the third direction D3 is opposite to the second direction D2. The second elastic element 494 is sheathed around the contact lever 492 and contacted with the scanning module 46. By the second elastic element 494, the contact lever 492 is fixed between the scanning module 46 and the push gear 491.

Moreover, the push gear 491 has a convex structure 4911. Upon rotation of the push gear 491, the convex structure 4911 may be contacted with the contact lever 492 to push the contact lever 492. In this embodiment, the convex structure 4911 is integrally formed with the push gear 491. Moreover, both of the first elastic element 493 and the second elastic element 494 are helical springs.

Moreover, the driving device 50 of the sheet-feeding type scanning apparatus 4 is used for providing a motive force. The transmission gear set 51 is connected with the driving device 50 and the push gear 491. By the transmission gear set 51, the motive force from the driving device 50 may be transmitted to the push gear 491 to result in rotation of the push gear 491. In this embodiment, the driving device 50 is a motor.

Figure 6:
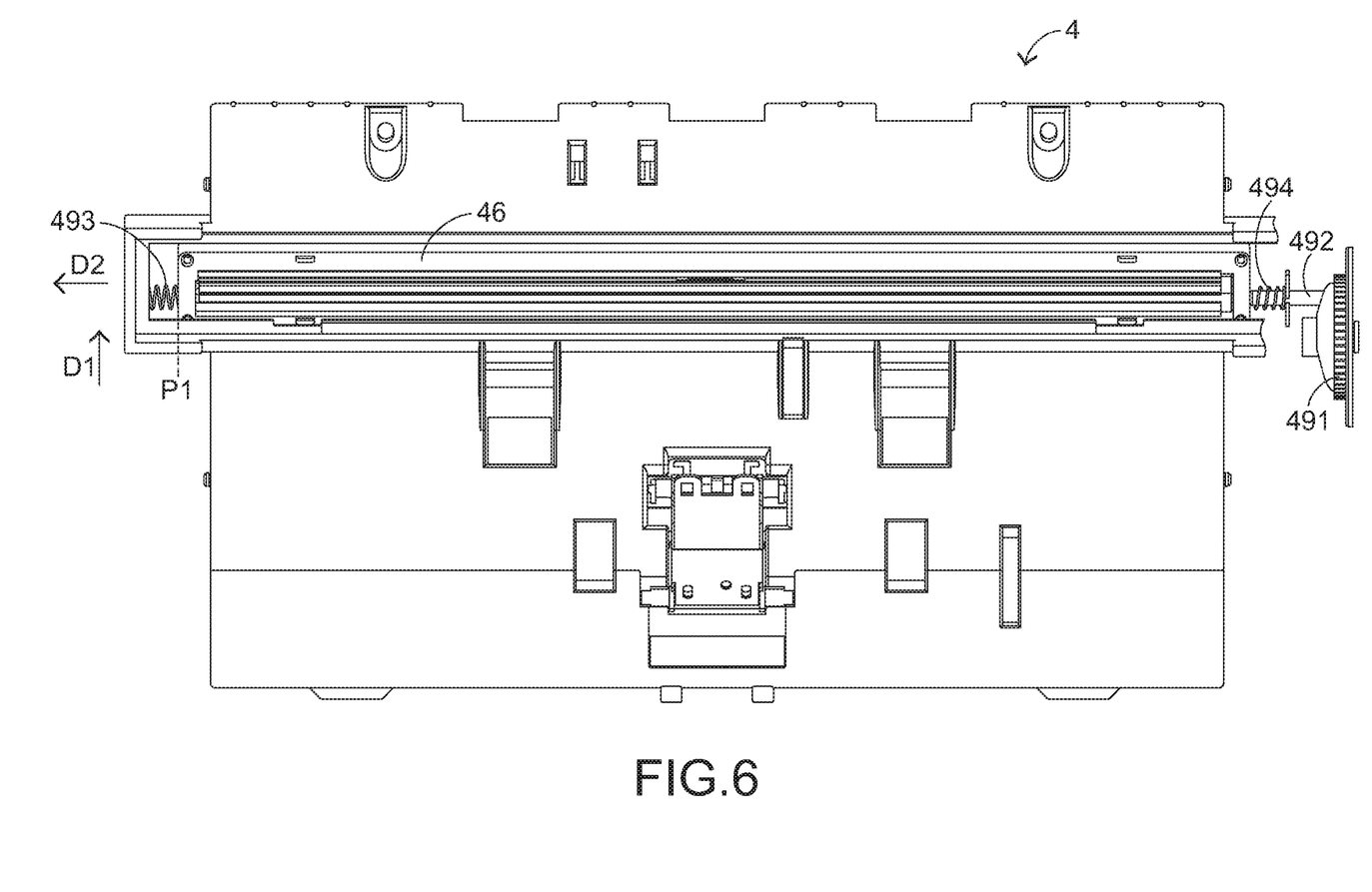
FIG. 6 is a schematic top view illustrating the scanning module of the sheet-feeding type scanning apparatus according to the first embodiment of the present invention, in which the scanning module is in a first position.
Figure 7:
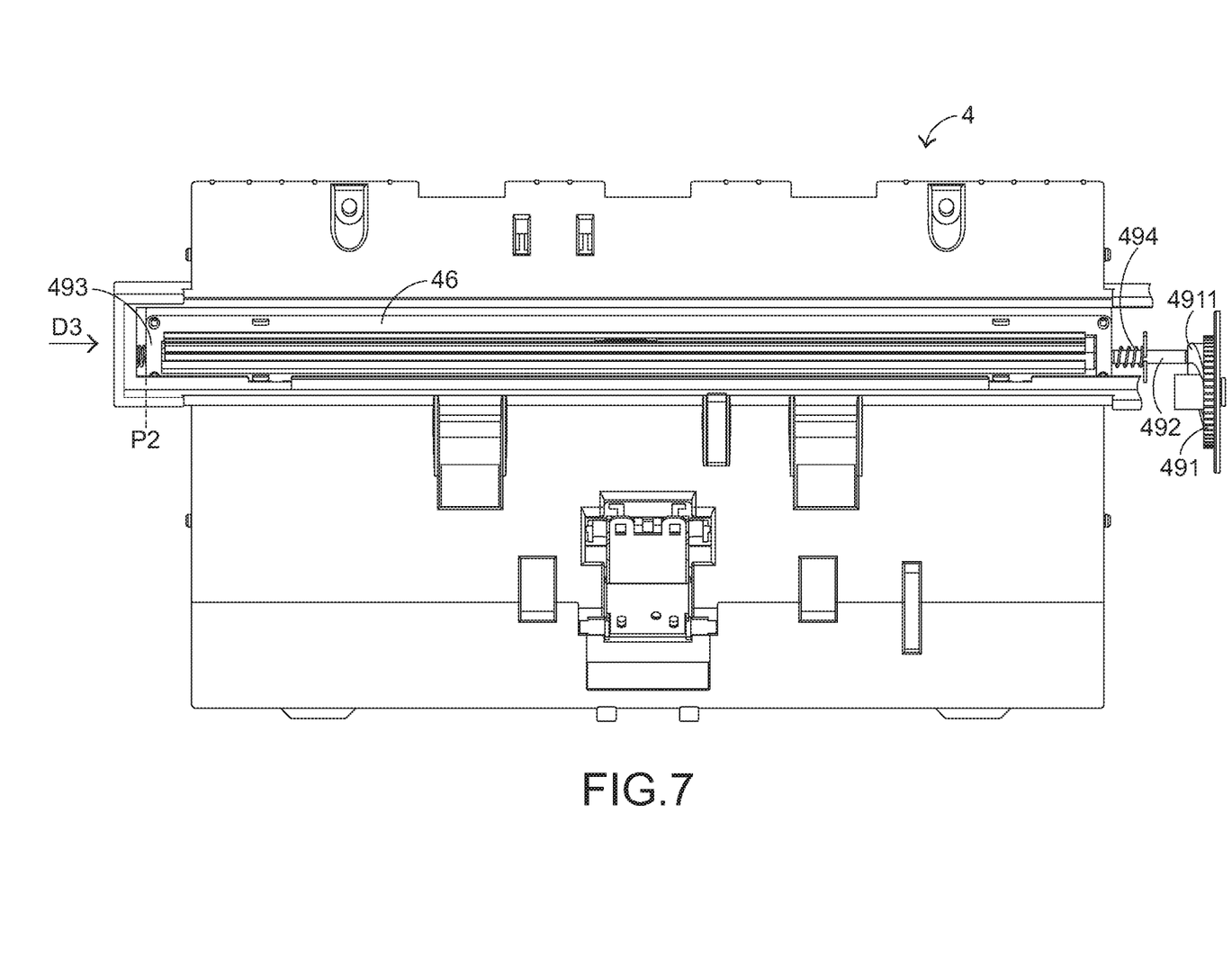
FIG. 7 is a schematic top view illustrating the scanning module of the sheet-feeding type scanning apparatus according to the first embodiment of the present invention, in which the scanning module is in a second position.

Hereinafter, a process of calibrating the scanning module 46 of the sheet-feeding type scanning apparatus 4 will be illustrated with reference to FIGS. 5, 6 and 7. FIG. 6 is a schematic top view illustrating the scanning module of the sheet-feeding type scanning apparatus according to the first embodiment of the present invention, in which the scanning module is in a first position. Before a scanning operation is performed on the document by the sheet-feeding type scanning apparatus 4, the scanning module 46 may perform a calibrating operation. Before the calibrating operation is started, the scanning module 46 is in a first position P1 (see FIG. 6). After the scanning module 46 starts performing the calibrating operation, the driving device 50 is enabled to provide the motive force. Consequently, the transmission gear set 51, which is connected with the driving device 50, is rotated. In addition, the motive force is transmitted to the push gear 491 of the transmission module 49 to result in rotation of the push gear 491.

As the push gear 491 is rotated, the convex structure 4911 of the push gear 491 is correspondingly moved. When the push gear 491 is rotated such that the convex structure 4911 of the push gear 491 is contacted with the contact lever 492 to push the contact lever 492, the contact lever 492 is moved in the second direction D2. As the contact lever 492 is moved in the second direction D2, the scanning module 46 is pushed by the contact lever 492, so that the first elastic element 493 at the second side of the scanning module 46 is pressed by the pushed scanning module 46. Under this circumstance, the first elastic element 493 is compressed to accumulate a first elastic force. Meanwhile, as shown in FIG. 7, the scanning module 46 is moved to a second position P2 in the second direction D2.

As the push gear 491 is continuously rotated and the convex structure 4911 of the push gear 491 is no longer contacted with the contact lever 492, the pushing force exerted on the scanning module 46 by the contact lever 492 is eliminated. Under this circumstance, the compressed first elastic element 493 is changed from the compressed state to a released state. Consequently, the first elastic force is released and exerted on the scanning module 46. In response to the first elastic force, the scanning module 46 is moved back to the first position P1 in the third direction D3. After the scanning module 46 has been calibrated, the sheet-feeding type scanning apparatus 4 starts feeding the document and scanning the document. The process of scanning the document will not be redundantly described herein. In this embodiment, a first calibrating operation is performed by scanning the calibration plate 48 while the scanning module 46 is moved from the first position P1 to the second position P2, and a second calibrating operation is performed by scanning the calibration plate 48 again while the scanning module 46 is moved from the second position P2 to the first position P1.

Since at least two calibrating operations are performed while the scanning module 46 is moved, it means that the scanning module 46 is dynamically calibrated. The way of dynamically calibrating the scanning module 46 can solve the following drawbacks. For example, if the scanning module 46 is immobile and the calibrating operation is performed at a fixed position and if the fixed position to be calibrated by the scanning module 46 at every time is contaminated with dust or dirt, the calibrating operation of the scanning module 46 may use the scanned dust or dirt as the calibration basis. Under this circumstance, the calibrating accuracy will be largely impaired. Whereas, since the scanning module 46 of the sheet-feeding type scanning apparatus 4 of the present invention is set to perform at least two calibrating operations during the moving process, the scanning module 46 may be dynamically calibrated. Consequently, the calibrating accuracy can be maintained at a desired level. Alternatively, in some other embodiments, the first calibrating operation is performed when the scanning module 46 is fixed at a specified position (e.g. the first position), and the second calibrating operation is performed while the scanning module 46 is moved from the specified position to another position.

Figure 8:
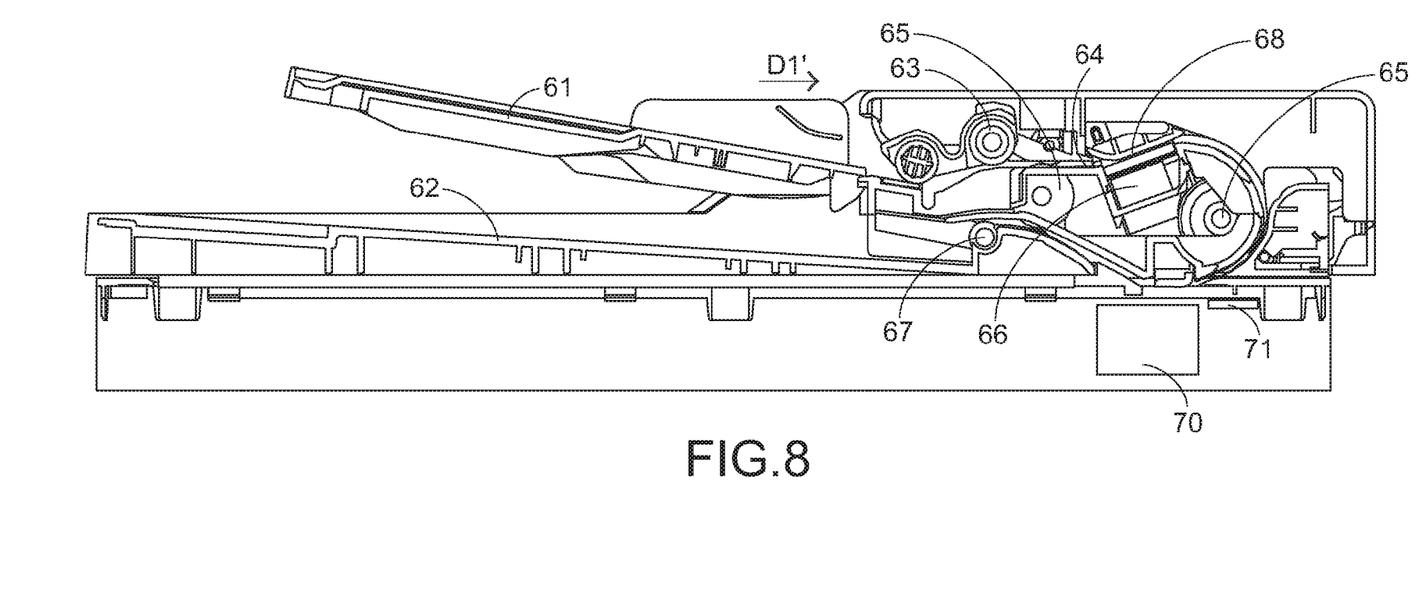
FIG. 8 is a schematic cross-sectional side view illustrating the structure of a sheet-feeding type scanning apparatus with a calibrating function according to a second embodiment of the present invention.

The present invention further provides a sheet-feeding type scanning apparatus with a calibrating function according to a second embodiment. FIG. 8 is a schematic cross-sectional side view illustrating the structure of a sheet-feeding type scanning apparatus with a calibrating function according to a second embodiment of the present invention. The sheet-feeding type scanning apparatus 6 comprises a sheet input tray 61, a sheet output tray 62, a sheet pick-up module 63, a sheet transfer channel 64, plural transfer rollers 65, a first scanning module 66, a sheet ejecting roller assembly 67, a first calibration plate 68, a transmission module 69 (see FIG. 9), a driving device (not shown), a transmission gear set (not shown), a second scanning module 70, and a second calibration plate 71. The structures and operating principles of the sheet input tray 61, the sheet output tray 62, the sheet pick-up module 63, the sheet transfer channel 64, the plural transfer rollers 65, the sheet ejecting roller assembly 67, the driving device and the transmission gear set are similar to those of the first embodiment, and are not redundantly described herein.

As shown in FIG. 8, the second scanning module 70 is disposed under the sheet transfer channel 64 for scanning a second side of a document (not shown), thereby acquiring a second side image of the document. The second calibration plate 71 is disposed above the second scanning module 70 for calibrating the second scanning module 70. The second scanning module 70 is moved in a first direction D1' in order to perform the calibrating operation. The process of moving the second scanning module 70 to perform the calibrating operation is similar to that illustrated in the conventional flatbed scanning portion 1, and is not redundantly described herein. Moreover, when a duplex scanning operation is performed by the sheet-feeding type scanning apparatus 6, the second scanning module 70 is not moved in the first direction D1' but is fixed at a specified position to scan the document.

Figure 9:
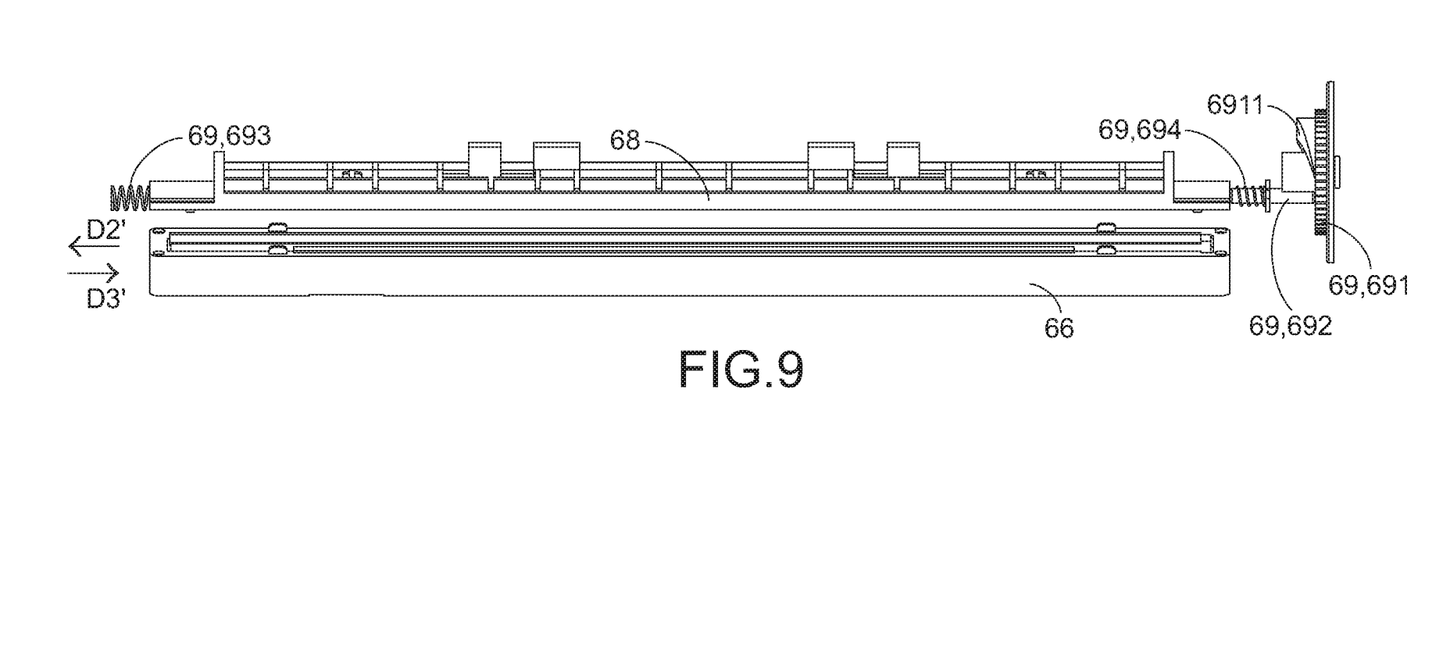
FIG. 9 is a schematic view illustrating the first scanning module, the calibration plate and the transmission module of the sheet-feeding type scanning apparatus according to the second embodiment of the present invention.

FIG. 9 is a schematic view illustrating the first scanning module, the calibration plate and the transmission module of the sheet-feeding type scanning apparatus according to the second embodiment of the present invention. In FIG. 9, the first scanning module 66, the first calibration plate 68 and the transmission module 69 are shown. Please refer to FIG. 9. The first calibration plate 68 is disposed over the first scanning module 66. The transmission module 69 is connected with the first calibration plate 68. The transmission module 69 is used for moving the first calibration plate 68 in a second direction D2' in order to perform a calibrating operation of the first scanning module 66, wherein the second direction D2' is perpendicular to the first direction D1'. The transmission module 69 comprises a push gear 691, a contact lever 692, a first elastic element 693, and a second elastic element 694. The push gear 691 is located at a first side of the first calibration plate 68. As the push gear 691 is rotated, the first calibration plate 68 is moved in the second direction D2'. Moreover, the push gear 691 has a convex structure 6911. As the push gear 691 is rotated, the convex structure 6911 may be contacted with the contact lever 692 to push the contact lever 692. In this embodiment, the convex structure 6911 is integrally formed with the push gear 691.

The contact lever 692 is contacted with the push gear 691, and arranged between the first calibration plate 68 and the push gear 691. Upon rotation of the push gear 691, the contact lever 692 is pushed by the push gear 691, and thus the first calibration plate 68 is pushed by the contact lever 692. Consequently, the first calibration plate 68 is moved in the second direction D2'. The first elastic element 693 is located at a second side of the first calibration plate 68 and contacted with the first calibration plate 68. The first elastic element 693 is used for providing a first elastic force to the first calibration plate 68. In response to the first elastic force, the first calibration plate 68 is moved in a third direction D3' opposite to the second direction D2' and returned to the original position. The second elastic element 694 is sheathed around the contact lever 692 and contacted with the first calibration plate 68. By the second elastic element 694, the contact lever 692 is fixed between the first calibration plate 68 and the push gear 691.

The process of performing the calibrating operation of the first scanning module 66 is similar to that of the first embodiment. In comparison with the first embodiment, the transmission module 69 is connected with the first calibration plate 68. Moreover, during the process of performing the calibrating operation, the first scanning module 66 is immobile, but the first calibration plate 68 is moved in the second direction D2' or the third direction D3' by the transmission module 69. Moreover, in an embodiment, for calibrating the first scanning module 66, a first calibrating operation is performed without the need of moving the first calibration plate 68, and a second calibrating operation is performed while the first calibration plate 68 is moved. In some other embodiments, a first calibrating operation is performed while the first calibration plate 68 is moved, and a second calibrating operation is performed while the first calibration plate 68 is returned to the original position.

Figure 10:
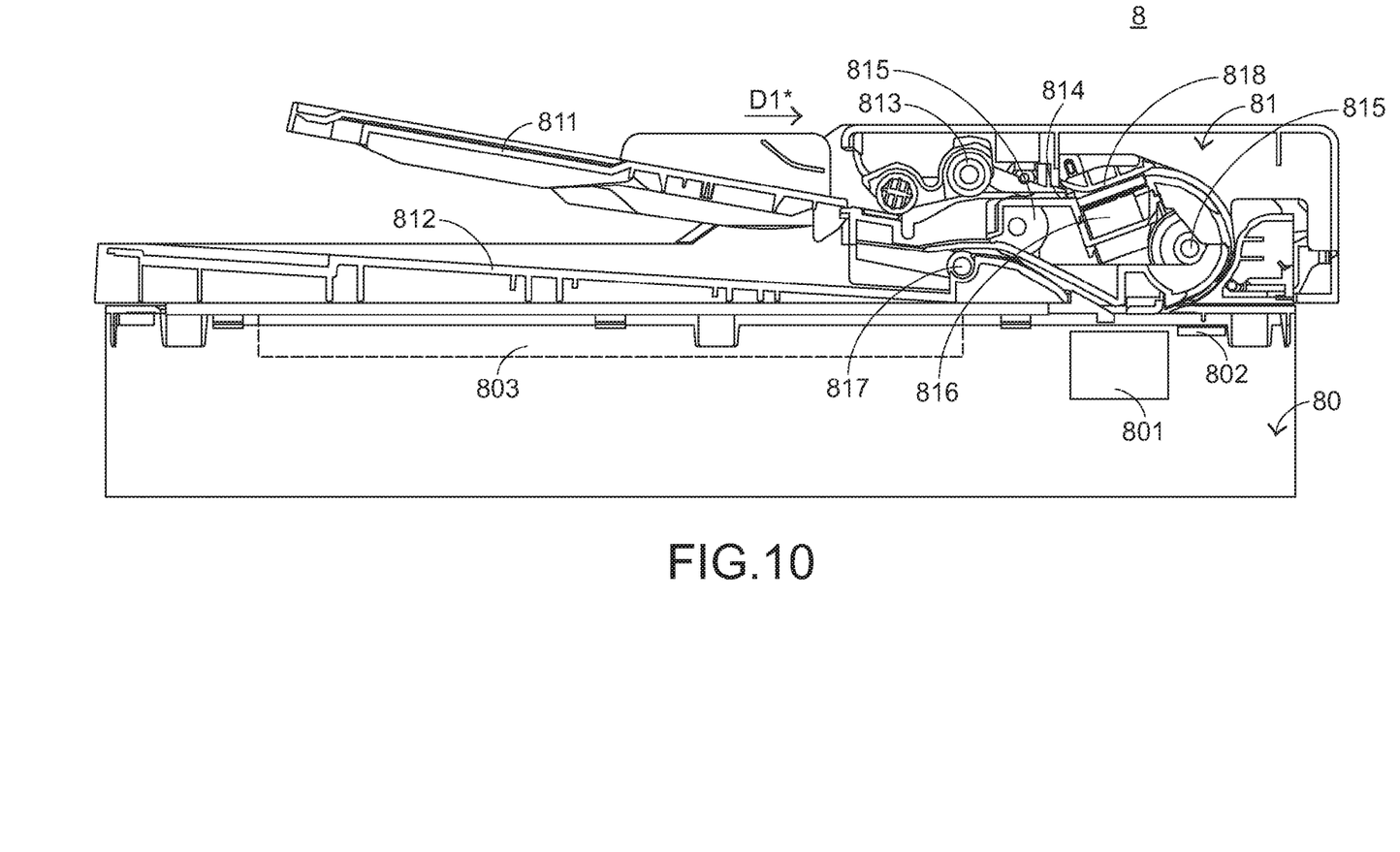
FIG. 10 is a schematic cross-sectional side view illustrating the structure of a duplex scanning apparatus with a calibrating function according to a third embodiment of the present invention.

The present invention further provides a duplex scanning apparatus with a calibrating function according to a third embodiment. FIG. 10 is a schematic cross-sectional side view illustrating the structure of a duplex scanning apparatus with a calibrating function according to a third embodiment of the present invention. The duplex scanning apparatus 8 is used for reading the image of a document (not shown). The duplex scanning apparatus 8 comprises a flatbed scanning portion 80 and a sheet-feeding type scanning apparatus 81. The flatbed scanning portion 80 is used for scanning a second side of the document, thereby acquiring a second side image of the document. In addition, the flatbed scanning portion 80 comprises a second scanning module 801, a second calibration plate 802, and a glass platform 803. The glass platform 803 is located at a top surface of the flatbed scanning portion 80. The second scanning module 801 is disposed within the flatbed scanning portion 80 for scanning the second side of the document, thereby acquiring the second side image. The second calibration plate 802 is disposed above the second scanning module 801 for calibrating the second scanning module 801. The second scanning module 801 is moved in a first direction D1* in order to perform the calibrating operation. The process of performing the calibrating operation of the second scanning module 801 is similar to that illustrated in the conventional flatbed scanning portion 1, and is not redundantly described herein.

Moreover, when a duplex scanning operation is performed by the duplex scanning apparatus 8, the second scanning module 801 is not moved in the first direction D1* but is fixed at a specified position to scan the document. Of course, since the duplex scanning apparatus 8 has the flatbed scanning portion 80, the flatbed scanning portion 80 may be employed to scan the document. After the document is placed on the glass platform 803, the second scanning module 801 is moved in the first direction D1* to scan the document.

As shown in FIG. 10, the sheet-feeding type scanning apparatus 81 is disposed over the flatbed scanning portion 80. The sheet-feeding type scanning apparatus 81 is used for feeding the document and moving the document into the sheet-feeding type scanning apparatus 81 in the first direction D1* in order to scan the document. The sheet-feeding type scanning apparatus 81 comprises a sheet input tray 811, a sheet output tray 812, a sheet pick-up module 813, a sheet transfer channel 814, plural transfer rollers 815, a first scanning module 816, a sheet ejecting roller assembly 817, a first calibration plate 818, a transmission module 819 (see FIG. 11), a driving device (not shown), and a transmission gear set (not shown). The structures and operating principles of the sheet input tray 811, the sheet output tray 812, the sheet pick-up module 813, the sheet transfer channel 814, the plural transfer rollers 815, the sheet ejecting roller assembly 817, the driving device and the transmission gear set are similar to those of the first embodiment, and are not redundantly described herein.

Figure 11:
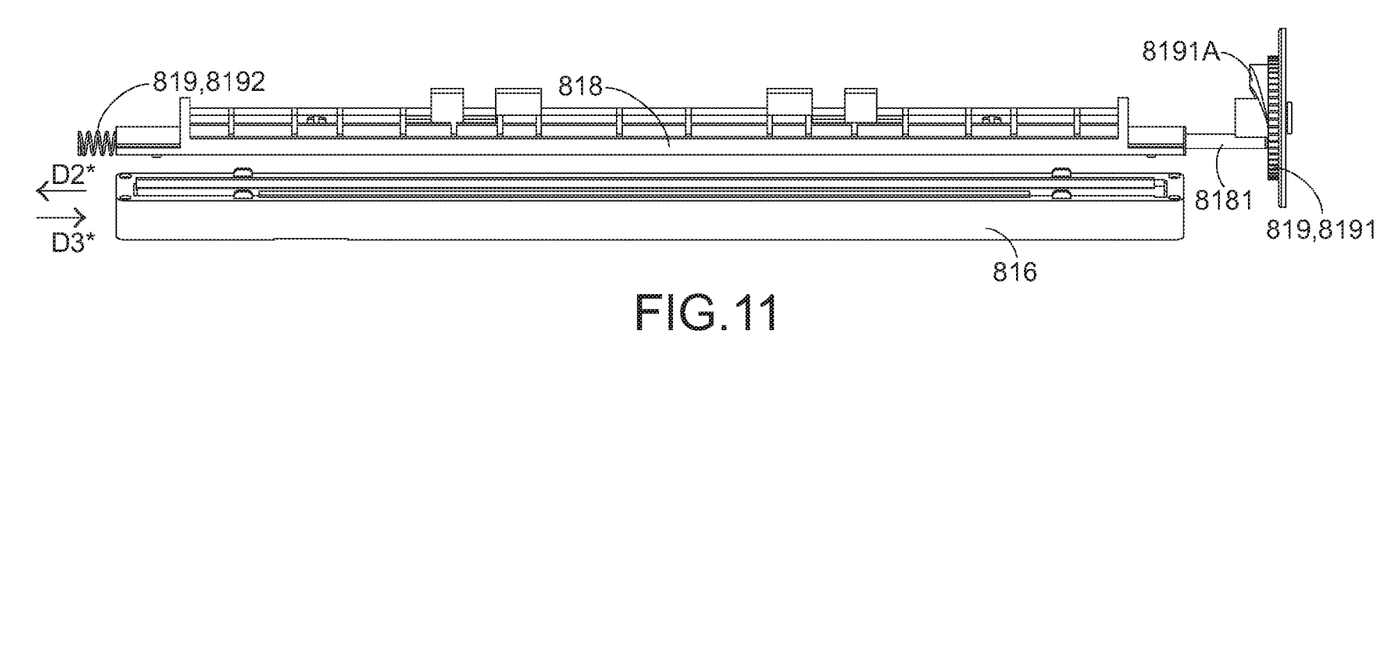
FIG. 11 is a schematic view illustrating the first scanning module, the calibration plate and the transmission module of the duplex scanning apparatus according to the third embodiment of the present invention.

FIG. 11 is a schematic view illustrating the first scanning module, the calibration plate and the transmission module of the duplex scanning apparatus according to the third embodiment of the present invention. In FIG. 11, the first scanning module 816, the first calibration plate 818 and the transmission module 819 are shown. Please refer to FIG. 11. The first calibration plate 818 is disposed over the first scanning module 816. The transmission module 819 is connected with the first calibration plate 818. The transmission module 819 is used for moving the first calibration plate 818 in a second direction D2* in order to perform a calibrating operation of the first scanning module 816, wherein the second direction D2* is perpendicular to the first direction D1*. The transmission module 819 comprises a push gear 8191 and an elastic element 8192. The push gear 8191 is located at a first side of the first calibration plate 818. As the push gear 8191 is rotated, the first calibration plate 818 is moved in the second direction D2*. The elastic element 8192 is located at a second side of the first calibration plate 818 and contacted with the first calibration plate 818. The elastic element 8192 is used for providing an elastic force to the first calibration plate 818. In response to the elastic force, the first calibration plate 818 is moved in a third direction D3* opposite to the second direction D2* and returned to the original position.

Moreover, the first calibration plate 818 further has a contact lever 8181. The contact lever 8181 is located at the first side of the first calibration plate 818, and contacted with the push gear 8191. On the other hand, the push gear 8191 has a convex structure 8191A. As the push gear 8191 is rotated, the convex structure 8191A may be contacted with the contact lever 8181 of the first calibration plate 818 to push the contact lever 8181. In this embodiment, the convex structure 8191A is integrally formed with the push gear 8191.

The process of performing the calibrating operation of the first scanning module 816 is similar to that of the second embodiment. In comparison with the second embodiment, the contact lever 8181 is disposed on the first calibration plate 818. Consequently, it is not necessary to install an additional elastic element on the contact lever 8181 to prevent detachment of the contact lever 8181 from the region between the first calibration plate 818 and the push gear 8191.

The present invention further provides a duplex scanning apparatus with a calibrating function according to a fourth embodiment. The duplex scanning apparatus comprises a flatbed scanning portion and a sheet-feeding type scanning apparatus. The flatbed scanning portion comprises a second scanning module, a second calibration plate, and a glass platform. The sheet-feeding type scanning apparatus comprises a sheet input tray, a sheet output tray, a sheet pick-up module, a sheet transfer channel, plural transfer rollers, a first scanning module, a sheet ejecting roller assembly, a first calibration plate, a transmission module, a driving device, and a transmission gear set. The structures and operating principles of these components are similar to those of the third embodiment, and are not redundantly described herein. For example, the transmission module has no contact lever, and the first scanning module has a contact lever. In comparison with the third embodiment, the transmission module is connected with the first scanning module. Consequently, the first scanning module may be dynamically calibrated while the first scanning module is moved from a position to another position. The way of dynamically calibrating the first scanning module is similar to that illustrated in the first embodiment, and is not redundantly described herein.

From the above description, the sheet-feeding type scanning apparatus and the duplex scanning apparatus of the present invention have the calibrating functions. The transmission module may be disposed within the limited space of the sheet-feeding type scanning apparatus. By the transmission module, the scanning module or the calibration plate is moved in the direction perpendicular to the sheet-feeding direction. Under this circumstance, since the scanning module or the calibration plate may be transversely moved, the scanning module can be dynamically performed. In other words, the duplex scanning apparatus with the calibrating function according to the present invention can be designed to have small volume. Moreover, the scanning module within the sheet-feeding type scanning apparatus can be calibrated to achieve desired scanning quality.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet-feeding type scanning apparatus with a calibrating function, said sheet-feeding type scanning apparatus being configured for feeding a document, moving said document in a first direction and reading an image of said document, said sheet-feeding type scanning apparatus comprising:
    a sheet transfer channel for allowing said document to go through;
    a scanning module disposed in said sheet transfer channel for scanning a first side of said document, thereby acquiring a first side image of said document;
    a calibration plate disposed over said scanning module, wherein said scanning module is calibrated according to said calibration plate; and
    a transmission module connected with said scanning module for moving said scanning module in a second direction perpendicular to said first direction, so that said scanning module is calibrated while said scanning module is moved, wherein said transmission module comprises:
        a push gear located at a first side of said scanning module, wherein upon rotation of said push gear, said scanning module is moved in said second direction; and
        an elastic element located at a second side of said scanning module for providing an elastic force to said scanning module, wherein in response to said elastic force, said scanning module is moved in a third direction opposite to said second direction and returned to an original position.

2. The sheet-feeding type scanning apparatus according to claim 1, wherein said transmission module further comprises a contact lever, wherein said contact lever is contacted with said push gear and arranged between said scanning module and said push gear, wherein when said contact lever is pushed by said push gear, said scanning module is pushed by said contact lever, so that said scanning module is moved in said second direction.

3. The sheet-feeding type scanning apparatus according to claim 2, wherein said transmission module further comprises an additional elastic element, which is sheathed around said contact lever and contacted with said scanning module, wherein by said additional elastic element, said contact lever is fixed between said scanning module and said push gear.

4. The sheet-feeding type scanning apparatus according to claim 1, wherein said scanning module further comprises a contact lever, wherein said contact lever is located at said first side of said scanning module and contacted with said push gear, wherein when said contact lever is pushed by said push gear, said scanning module is correspondingly moved, so that said scanning module is moved in said second direction.

5. The sheet-feeding type scanning apparatus according to claim 1, wherein said push gear has a convex structure, wherein upon rotation of said push gear, said convex structure is contacted with said contact lever to push said contact lever, wherein said convex structure is integrally formed with said push gear.

6. The sheet-feeding type scanning apparatus according to claim 1, further comprising:
    a driving device for providing a motive force; and
    a transmission gear set connected with said driving device and said push gear, wherein by said transmission gear set, said motive force is transmitted to said push gear to result in rotation of said push gear.

7. The sheet-feeding type scanning apparatus according to claim 1, further comprising:
    an additional scanning module disposed under said sheet transfer channel for scanning a second side of said document, thereby acquiring a second side image of said document; and
    an additional calibration plate disposed above said additional scanning module, wherein said additional scanning module is calibrated according to said additional calibration plate, wherein said additional scanning module is moved in said first direction to be calibrated.

8. The sheet-feeding type scanning apparatus according to claim 1, further comprising a flatbed scanning portion, wherein said flatbed scanning portion is disposed under said sheet transfer channel, and said flatbed scanning portion and said sheet-feeding type scanning apparatus are collaboratively defined as a duplex scanning apparatus, wherein said flatbed scanning portion comprises:
    a glass platform located at a top surface of said flatbed scanning portion;

an additional scanning module disposed within said flatbed scanning portion for scanning a second side of said document, thereby acquiring a second side image of said document; and an additional calibration plate disposed above said additional scanning module, wherein said additional scanning module is calibrated according to said additional calibration plate, wherein said additional scanning module is moved in said first direction to be calibrated.

9. A sheet-feeding type scanning apparatus with a calibrating function, said sheet-feeding type scanning apparatus being configured for feeding a document, moving said document in a first direction and reading an image of said document, said sheet-feeding type scanning apparatus comprising:

a sheet transfer channel for allowing said document to go through;

a scanning module disposed in said sheet transfer channel for scanning a first side of said document, thereby acquiring a first side image of said document;

a calibration plate disposed over said scanning module, wherein said scanning module is calibrated according to said calibration plate; and a transmission module connected with said calibration plate for moving said calibration plate in a second direction perpendicular to said first direction, so that said scanning module is calibrated while said calibration plate is moved, wherein said transmission module comprises:

a push gear located at a first side of said calibration plate, wherein upon rotation of said push gear, said calibration plate is moved in said second direction; and an elastic element located at a second side of said calibration plate for providing an elastic force to said calibration plate, wherein in response to said elastic force, said calibration plate is moved in a third direction opposite to said second direction and returned to an original position.

10. The sheet-feeding type scanning apparatus according to claim 9, wherein said transmission module further comprises a contact lever, wherein said contact lever is contacted with said push gear and arranged between said calibration plate and said push gear, wherein when said contact lever is pushed by said push gear, said calibration plate is pushed by said contact lever, so that said calibration plate is moved in said second direction.

11. The sheet-feeding type scanning apparatus according to claim 10, wherein said transmission module further comprises an additional elastic element, which is sheathed around said contact lever and contacted with said calibration plate, wherein by said additional elastic element, said contact lever is fixed between said calibration plate and said push gear.

12. The sheet-feeding type scanning apparatus according to claim 9, wherein said calibration plate further comprises a contact lever, wherein said contact lever is located at said first side of said calibration plate and contacted with said push gear, wherein when said contact lever is pushed by said push gear, said calibration plate is correspondingly moved, so that said calibration plate is moved in said second direction.

13. The sheet-feeding type scanning apparatus according to claim 9, wherein said push gear has a convex structure, wherein upon rotation of said push gear, said convex structure is contacted with said contact lever to push said contact lever, wherein said convex structure is integrally formed with said push gear.

14. The sheet-feeding type scanning apparatus according to claim 9, further comprising:

a driving device for providing a motive force; and a transmission gear set connected with said driving device and said push gear, wherein by said transmission gear set, said motive force is transmitted to said push gear to result in rotation of said push gear.

15. The sheet-feeding type scanning apparatus according to claim 9, further comprising:

an additional scanning module disposed under said sheet transfer channel for scanning a second side of said document, thereby acquiring a second side image of said document; and an additional calibration plate disposed above said additional scanning module, wherein said additional scanning module is calibrated according to said additional calibration plate, wherein said additional scanning module is moved in said first direction to be calibrated.

16. The sheet-feeding type scanning apparatus according to claim 9, further comprising a flatbed scanning portion, wherein said flatbed scanning portion is disposed under said sheet transfer channel, and said flatbed scanning portion and said sheet-feeding type scanning apparatus are collaboratively defined as a duplex scanning apparatus, wherein said flatbed scanning portion comprises:

a glass platform located at a top surface of said flatbed scanning portion;

an additional scanning module disposed within said flatbed scanning portion for scanning a second side of said document, thereby acquiring a second side image of said document; and an additional calibration plate disposed above said additional scanning module, wherein said additional scanning module is calibrated according to said additional calibration plate, wherein said additional scanning module is moved in said first direction to be calibrated.

* * * * *